United States Patent [19]
O'Connor et al.

[11] 3,782,183
[45] Jan. 1, 1974

[54] DETECTION OF PASTER WELDS WITH ACOUSTIC EMISSION

[75] Inventors: Donald T. O'Connor, Barrington Hills; David W. Prine, Maywood, both of Ill.

[73] Assignee: Magnaflux Corporation, Chicago, Ill.

[22] Filed: Dec. 2, 1971

[21] Appl. No.: 204,110

[52] U.S. Cl. .................................. 73/100, 73/67
[51] Int. Cl. ............................................. G01n 3/32
[58] Field of Search .................. 73/100, 67, 69; 181/0.5 AC, 0.5 NP, 0.5 AP

[56] References Cited
UNITED STATES PATENTS
3,545,262   12/1970   Steele et al. .................... 73/88.5 R OTHER PUBLICATIONS
Dunegan, H. L. et al. Acoustic Emission. From Research/Development, May 1971. pp. 20–24.

Frederick, J. R. Acoustic Emission as a Technique for Nondestructive Testing. From Materials Evaluation. pp. 43–47, Feb. 70, Vol. XXVIII, No. 2.

Primary Examiner—Jerry W. Myracle
Attorney—Carlton Hill et al.

[57] ABSTRACT

Method and apparatus for the nondestructive detection of paster welds wherein the test piece is repeatedly flexed at the weld to be tested, and then any acoustic emission produced by such flexing, indicative of the presence of a paster weld, is detected. The invention provides for apparatus to convert the acoustic emission to electrical pulses which may then be integrated to provide a signal dependent upon the amplitude and rate of such acoustic emission.

7 Claims, 6 Drawing Figures

DETECTION OF PASTER WELDS WITH ACOUSTIC EMISSION

BACKGROUND OF THE INVENTION

1. Field of the Invention

This invention is in the field of nondestructive testing of welded objects utilizing the generation of acoustic emission upon flexure of the welded joint, the amplitude and the rate of the pulses emitted being indicative of the presence of a defective paster weld.

2. Description of the Prior Art

In the past, there have been numerous test procedures developed, in addition to the conventional visual examination, for the non-destructive testing of the integrity of welds. In the case of tanks or other containers and pressure vessels, the soundness of the welds has been tested by the application of internal pressure. The vessel is completely filled with water, and all air bubbles are allowed to escape to eliminate air pockets. After the outlets to the vessel have been closed, a pump is operated to build up the pressure to several thousand pounds per square inch. For pressure vessels, this test is sometimes supplemented by means of a hammer test while the vessel is under a pressure of twice the determined operating pressure. Hammer blows are struck at intervals on both sides of the weld for a full length of the seam, followed by a complete visual inspection.

In the case of pipelines for oil or gas, an air pressure test has been used in which a test pressure of air is built up in the system and then each weld is painted with soapy water and inspected for bubbles which would indicate leaks.

Still another method which has been used in the past for detecting soundness of welds involves determining the sound a weld gives off when tapped with a hammer. The sound weld metal provides a ringing note, whereas a faulty weld gives a flat note. A physician's stethoscope can be used to magnify and identify the sounds produced.

X-ray testing for internal defects of welds has also been employed. Many types of cracks, slag inclusion, blowholes, lack of fusion and other defects can be detected by this method. The method consists in placing an X-ray tube on one side of the piece to be tested, and a sensitive photographic plate on the other. The resulting radiograph is a shadow picture of material more or less transparent to radiation. The X-rays darken the film so that regions of lower density which permit propagation appear dark on the negative in comparison with regions of high density which absorb more of the radiation. Thus, the imperfections which are less dense than the base metal show up as darkened regions on the radiograph.

A test similar to X-ray testing is performed using gamma rays. These rays penetrate metals more rapidly than does X-ray. It is therefore more applicable to heavy sections which would require extremely long exposure to X-rays.

Another highly developed test for determining defects in welds is the magnetic test. The magnetic reluctance of a weld of ferromagnetic material is increased by any faults present in it. If a magnetic flux is passed through the weld and the adjacent base metal, with the lines of flux approximately at right angles to the weld, there will be more leakage flux directly over the fault than over sound sections of the weld. The faults can be detected either by sifting iron filings or iron powder on a piece of paper placed on the welds, and observing the picture formed or by exploring with an instrument capable of determining the strength of the leakage flux.

Surface imperfections in welded joints can also be located by means of dye penetrant tests. In this type of test, an oily penetrant is applied over the area to be tested, and allowed to dwell on the surface for a short time. Excess penetrant is then removed, leaving the dyed penetrant in any surface discontinuities which may exist. The indications can be developed by means of a dry powder applied over the test area or by the use of a liquid suspension of such powder. The powder acts by capillary action to draw out any trapped dye penetrant to the surface which can then be inspected by means of visible light or ultraviolet light, depending on the nature of the dye in the penetrant.

More recently, ultrasonics have been used for the testing of welds in a process involving placing a quartz crystal transmitter in intimate contact with the metal object to be tested, by using a film of oil between the crystal and the metal. A short pulse of very high frequency sound is sent out by the transmitter and a reflected pulse is picked up by a crystal receiver. The output of the receiver is amplified and translated into a visual record. From the dimensions and geometry of the piece under test and the velocity of sound in the material, and the pattern produced, it is possible to determine the presence or absence of flaws.

Each of the foregoing test procedures can be used to advantage in detecting defects in welds but by and large they are limited in their applicability to the location of defects which might be termed gross defects. There is one type of defect, known in the trade as a paster weld, which cannot be reliably detected by any of the foregoing methods. In this type of weld, the weld metal may make close contact with the parent metal but does not actually intermingle at the interface of the two metals. This lack of fusion can sometimes be detected by radiography provided that the interface is sufficiently well defined. There are many instances, however, where the molten metal flowing upon the cold metal may develop a partial bond or where two molten edges coming together may form an apparently sound union, but where the separation of the molten fronts still exists so that there is no true molecular mingling at the interface. Joints of this type have very little strength. If the beam of radiation in radiography is not parallel with the plane of the fusion line, it will not be discovered and if the plane of fusion is extremely tight, it may also escape detection.

At one time, it was thought that the use of ultrasound would be an effective method of detecting paster welds, but it was soon learned that the acoustic energy is transmitted across such barriers if the barriers are of very small dimensions, on the order of 20 to 50 Angstrom units, the dimension on the order of a molecular diameter. Consequently, a welded tube might pass an ultrasonic test and still not be as strong as a properly welded joint should be. Paster welds have been troubling the tubing industry for years and may give rise to catastrophic gas transmission line failures in the field and forming failures when finished tubing is formed in bending machines.

The need still remains therefore for providing methods and apparatus for detecting paster welds reliably. The satisfaction of that need is the principal object of the present invention.

SUMMARY OF THE INVENTION

We have now discovered that the existence of paster welds can be detected by straining the test piece in the area of the weld under conditions of plastic deformation. When a paster weld is strained, it emits noises of an extremely low energy level over a wide frequency spectrum. A sound weld reacts to stress by plastic deformation without involving significant amounts of acoustic sounds. We make use of this characteristic by repeatedly flexing the weld joint and detecting any acoustic emission which may result upon the application of such stress. The acoustic energy thus picked up is translated into electrical impulses which can be amplified and used to trigger electronic circuitry to give an indication of both the pulse amplitude and repetition rate of the bursts of acoustic emission generated by defective welds. The circuitry is designed such that the significant bursts of acoustic energy can be distinguished from background noise which would tend to otherwise obscure such indications.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
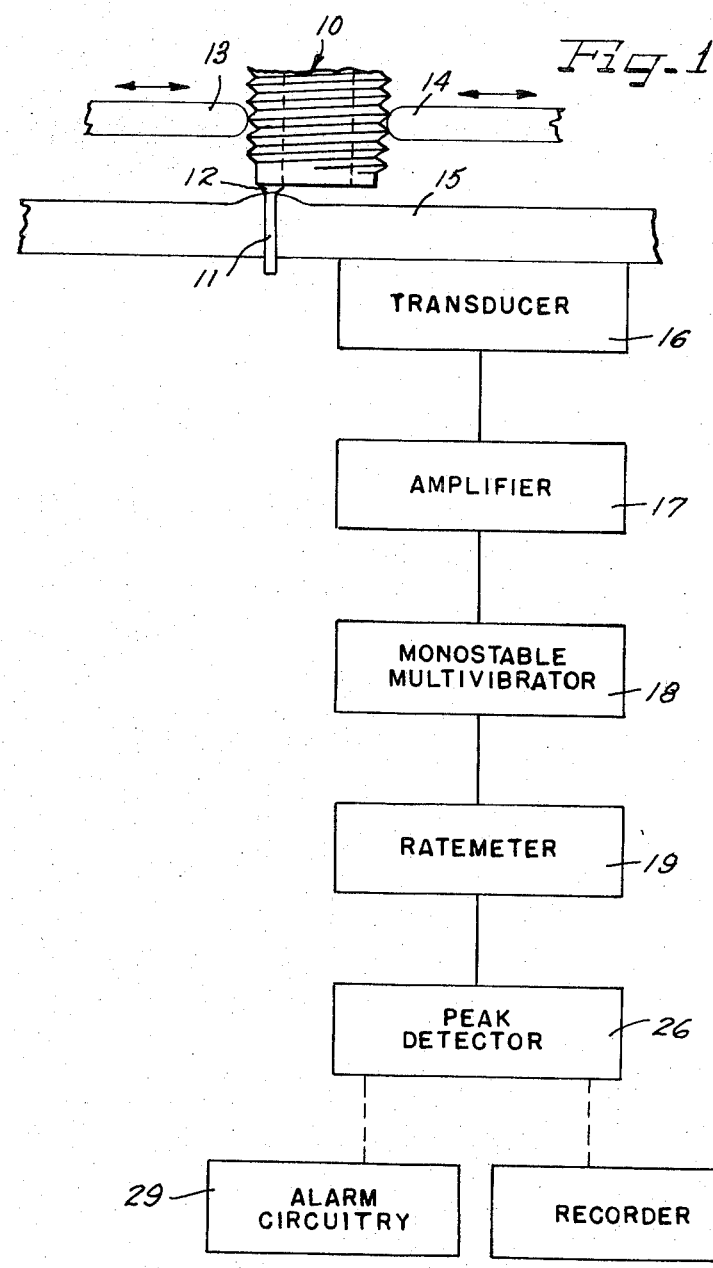
FIG. 1 is partially a schematic representation and partially a block diagram of an overall system for detecting defective paster welds in accordance with the present invention.

In FIG. 1, there is illustrated a system for detecting paster welds in ground electrodes which have been welded to a spark plug shell, but it will be understood that the method and apparatus can be applied to a wide variety of devices and different types of welds.

In FIG. 1, reference numeral 10 indicates generally a spark plug shell to which a ground electrode 11 has been welded, the weld joint being illustrated at reference numeral 12. The shell 10 is held between a pair of reciprocable clamping means 13 and 14 on opposed sides thereof, and the ground electrode 11 is held in a clamping device identified at reference numeral 15. It should be recognized that the shell 10 can be held in rigid relationship and the ground electrode 11 flexed to secure the same result. It is important that the ground electrode 11 be clamped in such a manner as to apply the maximum stress to the weld. The reciprocation of the clamping means 13 and 14 through several repetitive cycles serves to induce the formation of acoustic emission if a paster weld is present. It is believed that the noise from the paster weld is probably due to propagation of microscopic cracks. The brittle nature of the bad weld enhances the amount and rate of acoustic emission.

Generally, it is advisable to limit the amount of flexure at the weld joint such that it does not exceed an angle of about 10° from either side of the original axis of the electrode 11.

A transducer 16 is acoustically coupled to the clamping device 15 to detect a burst of acoustic energy. Transducers suitable for this purpose are available commercially and usually include disks of doped barium titanate where the transducer elements normally have their rear surfaces exposed to the air, and are provided with a wear plate of a durable plastic material at their front faces. Coupling of the transducer to the clamping device may be accomplished by interposing a thin layer of grease between the two. The resonance frequency of the transducer may vary widely on the order of 100 to 300 kilo Hertz, but most acoustic emission detectors operate at resonance frequencies of about 150 kilo Hertz.

The transducer 16 converts the bursts of acoustic energy into electrical energy pulses which are then passed to one or more amplifier stages 17 which are preferably of the narrow band type and tuned to resonate at the same frequency as the resonant frequency of the transducer 16. A narrow band tuned amplifier is preferred because this is the most convenient way to achieve the required high gain and low noise required to permit the small acoustic emission signals to be detected. While such narrow band width amplifiers may tend to obscure the true waveform of the acoustic emission signals, this distortion is not serious because the rate and the amplitude of the signals are more important than the shape of the pulses.

The output of the amplifier stages 17 is used to trigger a monostable multivibrator 18 to generate pulses having a duration of one millisecond or so when the input level to the multivibrator 18 is above a threshold value. The threshold, of course, can be adjusted by a sensitivity control in the multivibrator circuit.

Figure 2:
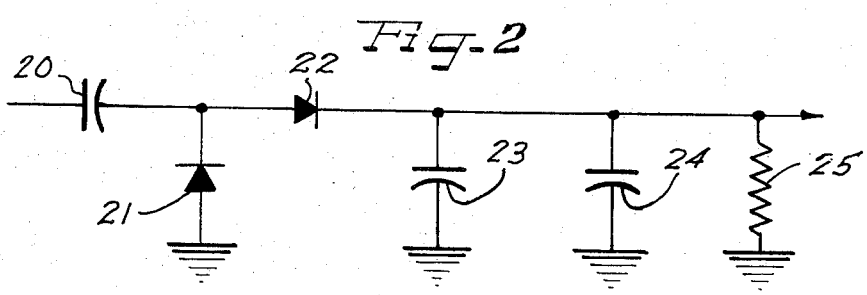
FIG. 2 is a circuit diagram of a suitable ratemeter which can be used.

Pulses generated by the multivibrator 18 are then passed to a ratemeter 19 which senses the rate at which the multivibrator is being triggered. A suitable circuit for such a ratemeter is shown in FIG. 2, and includes a coupling capacitor 20 which delivers the signal between a pair of diodes 21 and 22. A pair of capacitors 23 and 24 is connected in parallel and a D.C. potential whose amplitude is proportional to the pulse rate appears across a resistor 25 in parallel with the capacitors 23 and 24.

Figure 3:
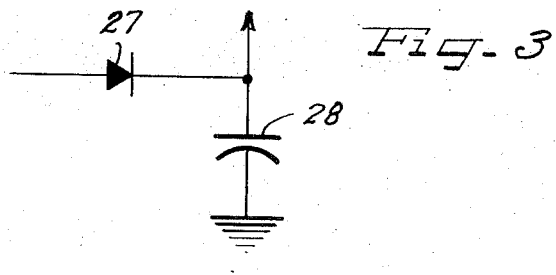
FIG. 3 is a circuit diagram of a suitable peak detector which can be employed.

The output of the ratemeter circuit 19 is passed to a peak detector 26 which may consist, as shown in FIG. 3, of a diode 27 and a capacitor 28. As illustrated in FIG. 1, the output of the peak detector 26 may optionally be passed to alarm circuitry 29 which energizes a visual or audible alarm at a sufficiently high input intensity, or to a recorder 30 such as a cathode ray tube or a strip chart recorder which provides a permanent record of the pulses.

Figure 4:
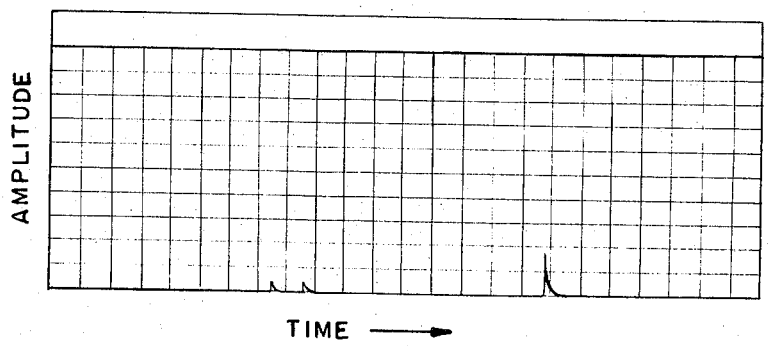
FIG. 4 is a typical chart representation obtained from a good weld.

In FIG. 4, there is a representation of the type of pattern observed on a strip recorder when testing a sound weld in accordance with the procedures of the present invention. The horizontal axis is the time axis, and the vertical axis represents amplitude. As illustrated in that figure, only a few low amplitude pulses are observed when testing a sound weld. This test was confirmed by a destructive test where it was found that it required thirty bends to produce failure, the failure occurring in the wire rather than at the weld.

Figure 5:
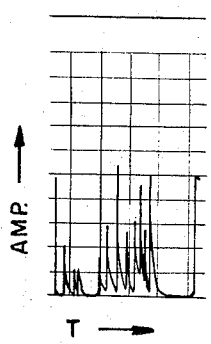
FIGS. 5 and 6 illustrate the type of indications obtained from paster welds.
Figure 6:
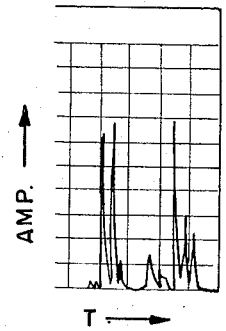

The results obtained from the chart of FIG. 4 should be compared with those of FIGS. 5 and 6. Both these charts represent results obtained from acoustic emission tests of defective paster welds, plotted on the same time and amplitude axis as that of FIG. 4. It will be noted that the amplitude and pulse repetition frequency of the pulses in both these charts are significantly higher than that in FIG. 4. Mechanical testing of both these welds showed failure of the welds by failure at six to seven cycles of bending.

It should be evident that various modifications can be made to the described embodiments without departing from the scope of the present invention.

We claim as our invention:

1. The method of testing a test piece for a paster weld which comprises supporting said test piece rigidly at an area spaced from the weld to be tested and along a predetermined axis, oscillating the test piece repeatedly while so supported to thereby cause flexing of said weld to both sides of said predetermined axis and detecting any acoustic emission produced by such flexing.

2. The method of claim 1 in which said flexing is applied to cause a deflection of said test piece of not more than about 10° from its original axis.

3. The method of claim 1 which includes the step of converting said acoustic emission into electrical pulses and integrating said electrical pulses to provide a signal dependent on the amplitude and rate of such acoustic emission.

4. The method of claim 3 which includes the step of operating an alarm device when said signal reaches a predetermined level.

5. An apparatus for detecting a paster weld which comprises means for holding the device to be tested in clamped engagement along a predetermined axis, means for repeatedly flexing said device at the weld to be tested on both sides of said axis, and sensor means positioned to pick up any acoustic emission resulting from such flexing.

6. The apparatus of claim 5 which includes an integrating means arranged to provide a signal dependent upon the size and rate of any acoustic emission picked up by said sensor means.

7. The apparatus of claim 5 which includes electrical pulse generating means actuated by electrical signals from said sensor means and rate detecting means responsive to the rate of pulses received from said pulse generating means.

* * * * *